3,179,171
INHIBITION OF SWELLING OF SILICATE-CONTAINING FORMATIONS EMPLOYING AN OXAZOLIDINONE POLYMER
Alvin F. Beale, Jr., Tulsa, Okla., assignor to The Dow Chemical Company, Midland, Mich., a corporation of Delaware
No Drawing. Filed Nov. 10, 1960, Ser. No. 68,371
10 Claims. (Cl. 166—42)

The invention is concerned with injecting aqueous base media into subterranean formations containing argillaceous material, i.e., formations which contain silicate compounds of the nature of clay, slate, and the like.

Argillaceous materials are often present in reservoir rock. These materials are relatively unstable, compared to other types of reservoir rock, in the presence of water. As a consequence thereof, during hydraulic fracturing or other well treatments, wherein an aqueous base medium is injected into the formation, such argillaceous materials, when thus contacted with water, brine, or emulsions containing water or brine, swell, separate, or disperse. As a result thereof, the porosity and the permeability of the formation are greatly impaired by the plugging of the pores which results from the shifting and swelling of the argillaceous material. Loss in porosity and permeability of a fluid-producing formation, or a formation through which a fluid is to be passed, is definitely undesirable. When a formation which contains argillaceous material has been treated by an aqueous medium, the swelling and shifting of the material therein has often greatly lessened the beneficial effect desired and in many instances has completely defeated the efforts to effect an improvement in the formation by the treatment and sometimes has resulted in serious impairment of the formation and decrease in production rate as a result of the treating operation.

The undesirable behavior of argillaceous material in a formation when contacted with an aqueous solution has long been known and as a consequence thereof numerous attempts have been made to lessen such undesirable effects. Such attempts include the addition of various materials to aqueous well-treating fluids to minimize the swelling tendency of argillaceous material such as montmorillonite, kaolinite, and illite. Among such materials that have been added for this purpose are formic acid salts, quaternary ammonium chloride compounds, water-soluble cellulose esters and ethers, and the product formed by reacting a basic nitrogen compound with an acid to form such salts as dipropylenetriamine trihydrochloride, tetraethylenepentamine pentaacetate and polyvinylpyridine bromide.

Despite the efforts which have been made to alleviate the plugging effect due to the swelling, i.e., volume increase of argillaceous material when contacted with water, and the numerous materials employed in well-treating operations to counteract the swelling effect, the problem remains acutely serious in any operation requiring that an aqueous solution or slurry be brought into contact with an argillaceous stratum in a subterranean formation, e.g., fracturing and acidizing or otherwise treating a formation, containing argillaceous material to improve the production of oil and/or gas from such a formation.

There exists a need for an improved composition and use thereof as an additament to aqueous fluids to be used in a subterranean formation containing argillaceous material and for a method of treating such formation traversed by a well employing a treating fluid containing such composition. There is a particular need for such composition in an aqueous acidic composition used in treating wells traversing or penetrating a formation containing argillaceous material.

The principal object of the invention is to meet these needs. The ensuing description and appended claims describe and define how the invention is to be practiced to attain these and related objects.

The invention, accordingly, is a method of treating a formation penetrated by a well which consists essentially of admixing, with an aqueous treating composition, at least 0.05 percent, by weight of said composition, of a polymer, prepared by addition polymerization through the olefinic double bond, of a reaction mixture containing at least one monomer selected from the class consisting of N-vinyl-2-oxazolidinone, alkyl substituted N-vinyl-2-oxazolidinones, N-vinyl- 2 - oxazinidinone, lower alkyl ring-substituted N-vinyl-2-oxazinidinones, N-vinyl morpholinone, lower alkyl ring-substituted N-vinyl morpholinone, N-vinyl pyrrolidone, lower alkyl ring-substituted N-vinyl pyrrolidones, mixtures of the aforenamed monomers, and copolymerizable mixtures of maleic anhydride and any one of said monomers, sulfonated styrene and any one of said monomers, acrylamide and any one of said monomers, and the free acid and water-soluble salts of polymers from said copolymerizable mixture. The composition so made is then injected down the well and back into the formation.

The polymer is usually employed in an amount of between about 0.1 and 0.5 percent and about 1.0 percent is considered to be a maximum amount to employ. By a lower alkyl radical is meant one containing from 1 to 4 carbon atoms per molecule.

It is to be understood that the monomeric mixture described above contains a suitable reaction medium, catalyst, modifier, and the like, employed in polymerization procedures and may contain small amounts of other monomers which do not adversely affect the polymerization procedure or the properties of the polymer being made.

Methods of preparing N-vinyl-2-oxazolidinone and methods of preparing the homopolymer of N-vinyl-2-oxazolidinone, having satisfactory properties for use in the practice of the invention, are set forth in U.S. Patent 2,818,362. Methods of preparing poly(N-vinyl-2-pyrrolidone), poly(N-vinyl-5-methyl-2-pyrrolidone) and copolymers of maleic anhydride and N-vinyl-2-pyrrolidone are described in U.S. Patent 2,901,457. Methods of preparing copolymers of N-vinyl-2-oxazolidinone and acrylamide and N-vinyl-2-oxazolidinone and styrene are also described in U.S. Patent 2,818,362. Methods of preparing alkyl substituted N-vinyl-2-oxazolidinones, sometimes referred to as N-vinyl-X-alkyl-2-oxazolidinones, and methods for preparing the homopolymer thereof, suitable for use in the practice of the invention, are described in U.S. Patent 2,919,279.

Methods of preparing copolymers of maleic anhydride with N-vinyl-cyclic carbamates of which N-vinyl-2-oxazinidinone, N-vinyl-2-oxazolidinone, and alkyl substituted N-vinyl-2-oxazolidinones are illustrative, are described in U.S. patent application S.N. 19,506, filed April 4, 1960.

As described in said application, a copolymer of maleic anhydride and an N-vinyl cyclic carbamate of the group consisting of N-vinyl-2-oxazinidinone, N-vinyl-2-oxazolidinone, and alkyl substituted derivatives thereof, may be represented as containing a plurality of recurring groups having the structure

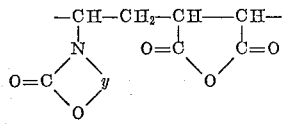

wherein $y$ is a divalent trimethylene radical or the divalent radical —RCH—RCH— in which one R is the methyl, diethyl, or phenyl radical and the other R is hydrogen or the methyl radical. The water-soluble salts such as the alkali metal and ammonium salts of the polymers are prepared by opening the anhydride rings by reaction with aqueous alkali metal hydroxides or carbonates or ammonium hydroxide. Such salts are readily soluble in both cold and hot water whereas the polymers containing the unmodified anhydride moiety are soluble only in hot water with concurrent reaction to hydrolyze the anhydride to the dibasic acid form. The water-soluble forms of the polymers are relatively stable when heated in an aqueous solution.

The polymers useful in the practice of the invention may be any within a wide range of relatively high molecular weights. For example, such polymers may be prepared having characteristic Fikentscher K values of about 10 to about 100 or more. The preparation of the polymers are carried out in a liquid medium under the influence of free radicals. It is desirable to carry out the reaction in an inert organic solvent and to employ a peroxide catalyst or the like as a source of free radicals to initiate the reaction.

The polymerization reaction is initiated and proceeds readily when the reactants are mixed and heated, with catalysts capable of liberating free radicals, preferably at temperatures of between about 35° and 120° C. Free radicals may be generated, if preferred, in the reaction mixture by irradiation with ultra-violet light, X-rays, or gamma rays.

Any suitable inert organic solvent may be employed in the reaction. It is desirable to employ one or a mixture of aromatic hydrocarbons such as benzene, toluene, or xylene, or halohydrocarbons such as methylene chloride or 1,2-dichloroethane, as the solvent. In such reaction media, the copolymer product precipitates, as formed, and is readily recovered by filtration or decantation. When such solvent as acetone or methyl ethyl ketone is employed, in which the copolymer is soluble, it must be recovered by conventional processes such as distillation.

The reactants are usually employed in an amount from about 5 to 25 percent by weight of the solution in the original reaction mixture. The reaction temperature varies depending upon the concentration of the reactants, the type and amount of catalyst, and the particular solvent or solvents employed. It is generally recommended to initiate the reaction at as low a temperature as the particular catalyst requires for producing an appreciable yield of free radicals and to complete the reaction at the boiling temperature of the solvent system employed. Among the more active catalysts employed is azobisisobutyronitrile wherein the reaction may be initiated at a temperature of from 35° to 45° C. and then, due to exothermal heat produced by the reaction be allowed to heat autogenously a sufficient period of time to effect the desired polymerization. Less active catalysts, e.g., lauroyl peroxide, require higher temperatures, wherein the reaction is initiated at say of about 60° to 80° C., and completed at from about 80° to 120° C. Heating of the reaction mixtures should be gradual and controlled in order to avoid the sudden onset of polymerization which may then progress at an uncontrollable rate.

The copolymerization reaction is conveniently carried out under normal atmospheric pressures although the reaction under somewhat elevated or reduced pressures may be carried out, if desired.

When the popolymer is that of maleic anhydride and N-vinyl morpholinone, N-vinyl pyrrolidone, or an N-vinyl cyclic carbamate, the reactant monomers are usually employed in substantially equimolar proportions, although an excess of either reactant may be employed if desired. Commercially available maleic anhydride may be used. However, it sometimes contains appreciable quantities of free acid which may foster decomposition of the cyclic carbamate reactant when the reaction mixture is heated. This problem can be minimized by neutralizing free acid, as, for example, by passing ammonia through the reaction mixture, before initiating the copolymerization. Examples illustrative of the preparation of copolymers of maleic anhydride and N-vinyl cyclic carbamates are set out in application Serial No. 19,506.

As aforesaid, the instant invention can be carried out in either a fresh water, brine, or acidic aqueous medium. The effectiveness of the composition of the invention to lessen swelling of argillaceous material in formations containing such material is especially marked where aqueous acidic solutions are employed as the treating liquid.

A series of tests was run to show the swelling effect of fresh water and of aqueous acidic solutions on various types of argillaceous material both in the absence of the additament in accordance with the invention and in the presence of such additament.

The tests wherein fresh water was used were run as follows:

100 milliliters of water, either without the polymer added, for purposes of comparison, or with the polymer added thereto in accordance with the invention, were placed in the pear-shaped centrifuge tube described in ASTM test designated D96–52T, ASTM Standards, 1952, part V, pages 48–50. One gram of an argillaceous or silicate-containing solid material, of a type most commonly found in oil-producing reservoir, ground to a fineness of between 100 and 200 mesh (U.S. Bureau of Standards Series), was poured into the centrifuge tube containing the water and allowed to slowly settle through the water. About 5 minutes thereafter, the centrifuge tube was shaken by hand for 5 to 10 seconds to insure further that all solids had been wet by the water. The tube was then allowed to stand for 16 hours under atmospheric conditions to allow ample time for swelling to occur and was thereafter centrifuged at 1000 r.p.m. for 1 minute. The argillaceous material was thereby caused to pack in the tube bottom. The thus packed material in the centrifuge tube was then measured. The value of the additament as an inhibitor to the swelling of the argillaceous material was determined by comparing the relative volumes obtained in (1) an inert medium (kerosene being used), (2) water to represent a substantially neutral untreated aqueous medium, and (3) water containing 0.1 percent by weight of the sodium salt of the copolymer prepared by polymerizing a substantially equimolar monomeric mixture of maleic anhydride and N-vinyl-5-methyl-2-oxazolidinone, as illustrative of the polymer inhibitor to argillaceous swelling in accordance with the invention. A gram of the argillaceous material was placed in kerosene and the volume therein measured and given a value of 1 volume unit. The resulting volumes obtained where 1 gram of the argillaceous material was contacted with fresh water both with and without the polymer inhibitor are set out in Table I, infra.

The testing procedure employed for the aqueous acidic composition was substantially that followed for the fresh water, as set out above, except as follows: 15-milliliter portions of a 15 percent by weight hydrochloric acid solution were first placed in 100 milliliter beakers. In the examples illustrative of the invention, the polymer in the amount set forth in Table I, was added. In other test runs, for purposes of comparison, no polymer was added. To each of the beakers containing the aqueous acidic solution and the swelling control agent, in the case of the examples, were added 3.34 grams of calcium carbonate (to simulate the calcium carbonate of a limestone formation being acidized) and 1 gram of the argillaceous material set forth in Table I. Time was then allowed for the acid to react with the calcium carbonate and thereafter the contents of the beaker were transferred to a 100 milliliter pear-shaped centrifuge tube, described in the ASTM test above, and diluted to 50 milliliters with water. The mixture was then allowed to stand for 16 hours and thereafter was centrifuged for 1 minute at 1000 r.p.m. The volume of the packed solids in the bottom of the centrifuge tube was then measured. A comparison of the volumes was made among: an inert medium (kerosene being used), (2) an aqueous acidic medium, and (3) the aqueous acidic medium containing the polymer for inhibiting the swelling of the argillaceous material in accordance with the invention.

Reference to Table I shows that the swelling of any one of the argillaceous materials, therein set out, was clearly lessened by the presence of the polymer used in accordance with the invention.

Since argillaceous strata in limestone formations is considered to be among the most troublesome of the formations encountered in oil-producing reservoirs, specimens of such formation were employed in a second series of tests to show the effectiveness of various polymers to inhibit the swelling of the argillaceous strata therein in accordance with the practice of the invention. The tests of this series were carried out by dissolving 0.1 percent of the polymer employed in either fresh water or in a 15 percent by weight aqueous hydrochloric acid solution which had become spent by reacting it with calcium carbonate in accordance with the procedure set out in the tests of Series 1. The copolymers employed were all prepared from substantially 50:50 molar ratio monomeric mixtures. The argillaceous-containing materials employed in the second series of tests were specimens obtained from the Mesa Verde formation of Colorado which consisted of 90 percent limestone interbedded with 10 percent montmorillonite to which was admixed 5 percent of Wyoming bentonite by weight thereof. The relative volume of the argillaceous material employed when measured in kerosene was 1. The argillaceous material when measured in untreated fresh water was 2 milliliters and when measured in the spent 15 percent untreated aqueous hydrochloric acid solution was 2.34 milliliters. The volumes, based upon the volume of the material in kerosene as 1, of the argillaceous material after being subjected to either fresh water or the spent 15 percent aqueous hydrochloric acid solution with which had been admixed 0.1 percent polymer in accordance with the invention, as determined according to the procedure of Series 1, are set out in Table II below.

Table II

| Example number | Polymeric material* | Relative volumes of argillaceous-containing material** | |
|---|---|---|---|
| | | In fresh water | In 15% by weight hydrochloric acid |
| 6 | Homopolymer of VO [1] | 1.04 | 1.19 |
| 7 | Homopolymer of VMO [2] | 1.09 | 1.30 |
| 8 | Sodium salt of copolymer of MA [3] and VO. | 1.05 | 1.29 |
| 9 | Copolymer of AA [4] and VO. | 1.15 | 1.19 |
| 10 | Sodium salt of copolymer of MA and VMO. | 1.00 | 1.17 |
| 11 | Copolymer of AA and VMO. | 1.00 | 1.15 |
| 12 | Sodium salt of copolymer of SS [5] and VMO. | 1.03 | 1.21 |
| 13 | Sodium salt of copolymer of MA and VEO.[6] | 1.09 | 1.30 |
| 14 | Sodium salt of copolymer of MA and VP.[7] | 1.14 | 1.41 |
| 15 | Sodium salt of copolymer of MA and VM.[8] | 1.49 | 1.75 |

[1] VO is N-vinyl-2-oxazolidinone.
[2] VMO is N-vinyl-5-methyl-2-oxazolidinone.
[3] MA is maleic anhydride.
[4] AA is acrylamide.
[5] SS is sodium styrene sulfonate.
[6] VEO is N-vinyl-5-ethyl-2-oxazolidinone.
[7] VP is N-vinyl pyrrolidone.
[8] VM is N-vinyl morpholinone.
*All copolymers were prepared from a 50:50 molar ratio of the named monomers.
**The volume of the argillaceous material in kerosene was 1.

Table I

| Example No. | Argillaceous material [1] | Relative volumes | | | |
|---|---|---|---|---|---|
| | | In water | | In 15% by weight hydrochloric acid | |
| | | Without polymer | Polymer [2] added | Without polymer | Polymer added |
| 1 | Bentonite | 3.2 | 1.6 | 4.1 | 1.4 |
| 2 | Montmorillonite | 2.0 | 1.1 | 1.9 | 1.3 |
| 3 | Kaolinite | 1.5 | 1.1 | 1.9 | 1.2 |
| 4 | Illite | 1.2 | 1.0 | 1.3 | 1.0 |
| 5 | Serpentine | 1.3 | 1.0 | 1.6 | 1.0 |

[1] The volume of the argillaceous material in kerosene was 1.
[2] 0.1 percent by weight of the sodium salt of copolymer of maleic anhydride and N-vinyl-5-methyl-2-oxazolidinone.

Referring to Table II, it can be seen that the use of any of the polymers there shown, in either water or an acid, appreciably reduced the swelling effect thereof on bentonite. Particularly effective were the homopolymers of N-vinyl-2-oxazolidinone as illustrated by Example 6 and copolymers of N-vinyl-5-methyl-2-oxazolidinone copolymerized with maleic anhydride, as illustrated by Example 10, or copolymerized with acrylamide as illustrated by Example 11.

A third series of runs consisting of Examples 16–24 was run to ascertain the operable and preferred limits of the polymer to employ in aqueous compositions in accordance with the practice of the invention. A copolymer of N-vinyl-5-methyl-2-oxazolidinone and maleic anhydride was employed in varying amounts in Examples 16–20, and a copolymer of N-vinyl-5-methyl-2-oxazolidinone and acrylamide in Examples 21–24. An argillaceous material was that employed in Series 2 above. The volume of argillaceous material employed was 1, measured in kerosene. This volume swelled to a relative volume of 2 when subjected to the test described in Series 1 and 2 above. When the tests were repeated, employing the amount of the polymer set out in Table III, below, the swelling was lessened as shown by the values set out, also, in Table III.

*Table III*

| Example No. | Polymer added, in percent by weight | Volume of argillaceous material |
|---|---|---|
| 16 | 0.5 of sodium salt of copolymer of VMO.† and MA.† | 1.01 |
| 17 | 0.1 of sodium salt of copolymer of VMO.† and MA.† | 1.00 |
| 18 | 0.05 of sodium salt of copolymer of VMO.† and MA.† | 1.19 |
| 19 | 0.025 of sodium salt of copolymer of VMO.† and MA.† | 1.97 |
| 20 | 0.005 of sodium salt of copolymer of VMO.† and MA.† | 2.00 |
| 21 | 0.5 of copolymer of VMO and AA † | 1.00 |
| 22 | 0.1 of copolymer of VMO and AA † | 1.00 |
| 23 | 0.05 of copolymer of VMO and AA † | 1.29 |
| 24 | 0.025 of copolymer of VMO and AA † | 2.00 |

† See footnotes of Table II, supra.

Reference to Table III shows that the copolymers employed in the third series of runs, which are illustrative of the polymers of the invention, are highly effective in lessening or inhibiting the swelling of argillaceous material in a limestone-type formation when contacted with an aqueous fluid when said polymer is employed in an amount between 0.05 and 0.5 percent by weight of the fluid.

Some benefit is evidenced when a lesser amount than 0.05 percent is employed, but such lesser amount is not recommended. On the other hand, no detrimental accompanying effects have been observed to result from the use of more than 0.5 percent but as shown by the results of the table (where 0.5 percent resulted in substantially no swelling) the use of more than 0.5 percent would serve no useful end.

The advantages to be realized from the practice of the invention are clearly extensive, since the highly objectionable swelling of such argillaceous materials as clay, shale, and the like, when contacted with an aqueous fluid, resulting in plugging and seriously reduced permeability of a formation containing any of such materials, is markedly lessened by admixing a small amount of the polymer, as hereinbefore described, with an aqueous fluid to be injected into a formation.

Having described the invention, what is claimed and desired to be protected by Letters Patent is:

1. A method of treating a formation containing argillaceous material and penetrated by a well consisting essentially of admixing an aqueous treating fluid with between about 0.05 and about 1.0 percent, by weight of said fluid, of a polymer prepared by polymerizing a polymerizable amount of a reaction material selected from the class consisting of (1) at least one monomer selected from the class consisting of N-vinyl-2-oxazolidinone, N-vinyl-2-oxazinidinone, N-vinyl morpholinone, N-vinyl pyrrolidone and alkyl-substituted derivatives thereof wherein an alkyl group of from 1 to 4 carbon atoms is attached to a carbon atom of the ring, (2) at least one of said monomers and maleic anhydride, (3) at least one of said monomers and sulfonated styrene, (4) at least one of said monomers and acrylamide, and (5) free acids and salts of polymers prepared by polymerizing said reaction mixture, and injecting the resulting admixture down the well and back into the formation.

2. The method according to claim 1 wherein said polymer is the homopolymer of N-vinyl-2-oxazolidinone.

3. The method according to claim 1 wherein said polymer is the homopolymer of N-vinyl-4-alkyl-2-oxazolidinone, and the alkyl group has the limitation stated therein.

4. The method according to claim 1 wherein said polymer is the homopolymer of N-vinyl-5-alkyl-2-oxazolidinone, and the alkyl group has the limitation stated therein.

5. The method according to claim 1 wherein said polymer is the copolymer of maleic anhydride and N-vinyl-2-oxazolidinone.

6. The method according to claim 1 wherein said polymer is the copolymer of maleic anhydride and N-vinyl-4-alkyl-2-oxazolidinone and the alkyl group has the limitation stated therein.

7. The method according to claim 1 wherein said polymer is the copolymer of maleic anhydride and N-vinyl-5-alkyl-2-oxazolidinone and the alkyl group has the limitation stated therein.

8. The method according to claim 1 wherein said polymer is the copolymer of sulfonated styrene and any one of said monomers.

9. The method according to claim 1 wherein said polymer is the copolymer of acrylamide and any one of said monomers.

10. The method according to claim 1 wherein an acid is admixed with said aqueous fluid to render it acidic.

References Cited by the Examiner

UNITED STATES PATENTS 2,667,473   1/54   Morner et al.   260—85.7
2,801,984   8/57   Morgan   166—33
2,841,222   7/58   Smith   166—42

CHARLES E. O'CONNELL, *Primary Examiner.*
BENJAMIN BENDETT, NORMAN YUDKOFF,
                                                  *Examiners.*